United States Patent
Dai et al.

(10) Patent No.: US 11,978,143 B2
(45) Date of Patent: May 7, 2024

(54) CREATION OF VIDEOS USING VIRTUAL CHARACTERS

(71) Applicant: Lemon Inc., Grand Cayman (KY)

(72) Inventors: Zeng Dai, Los Angeles, CA (US); Yunzhu Li, Los Angeles, CA (US); Nite Luo, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 17/751,222

(22) Filed: May 23, 2022

(65) Prior Publication Data

US 2023/0377236 A1 Nov. 23, 2023

(51) Int. Cl.
*G06T 13/40* (2011.01)
*G06T 15/00* (2011.01)
*G06T 15/04* (2011.01)
*G06V 40/10* (2022.01)

(52) U.S. Cl.
CPC ............ *G06T 13/40* (2013.01); *G06T 15/005* (2013.01); *G06T 15/04* (2013.01); *G06V 40/10* (2022.01)

(58) Field of Classification Search
CPC ....... G06T 13/40; G06T 15/005; G06T 15/04; G06V 40/10
See application file for complete search history.

(56) References Cited

U.S. PATENT DOCUMENTS

| | | | | |
|---|---|---|---|---|
| 9,251,613 B2* | 2/2016 | Hsun | ................... | G06T 11/60 |
| 10,049,435 B2* | 8/2018 | Paris | .................... | G06T 3/4038 |
| 10,872,637 B2* | 12/2020 | Oxholm | ............. | H04N 9/873 |
| 2004/0062439 A1* | 4/2004 | Cahill | ................ | G06T 5/50 |
| | | | | 382/209 |
| 2005/0275653 A1* | 12/2005 | Keller | .............. | G06T 15/06 |
| | | | | 345/419 |
| 2009/0141026 A1* | 6/2009 | Raab | ................. | G06T 15/06 |
| | | | | 345/424 |
| 2013/0235045 A1* | 9/2013 | Corazza | ............. | G06V 40/172 |
| | | | | 345/473 |
| 2014/0219579 A1* | 8/2014 | Lischinski | ......... | G06F 17/15 |
| | | | | 382/279 |
| 2015/0213604 A1* | 7/2015 | Li | ................. | G06T 13/80 |
| | | | | 345/473 |

(Continued)

FOREIGN PATENT DOCUMENTS

CN 101609557 A * 12/2009

OTHER PUBLICATIONS

International Patent Application No. PCT/SG2023/050313; Int'l Search Report; dated Nov. 14, 2023; 3 pages.

(Continued)

*Primary Examiner* — Abderrahim Merouan
(74) *Attorney, Agent, or Firm* — BakerHostetler

(57) ABSTRACT

The present disclosure describes techniques for creating videos using virtual characters. Creation of a video may be initiated by a user. Camera input comprising a human body of the user may be received. The camera input may be split into a first stream for removing the human body and a second stream for animating a virtual character in the video. An inpainting filter may be applied to remove the human body in real time from the camera input. The inpainting filter may be configured to accelerate texture sampling. Output of the inpainting filter may be blended with images comprised in the camera input to generate camera input backgrounds.

17 Claims, 10 Drawing Sheets

(56) References Cited

U.S. PATENT DOCUMENTS

| | | | | |
|---|---|---|---|---|
| 2015/0257035 | A1* | 9/2015 | Grinshpun | H04L 65/613 |
| | | | | 370/235 |
| 2016/0110848 | A1* | 4/2016 | Gray | H04N 23/64 |
| | | | | 382/173 |
| 2017/0188002 | A1* | 6/2017 | Chan | H04N 13/122 |
| 2019/0325633 | A1* | 10/2019 | Miller, IV | G06T 13/40 |
| 2021/0099761 | A1* | 4/2021 | Zhang | H04N 21/233 |
| 2021/0133986 | A1* | 5/2021 | Lee | G06T 5/002 |
| 2021/0166461 | A1* | 6/2021 | Riesen | G06T 1/60 |
| 2022/0108420 | A1* | 4/2022 | Ratcliff | G02B 27/0172 |
| 2022/0188973 | A1* | 6/2022 | Puttagunta | G06T 3/4007 |

OTHER PUBLICATIONS

Weisstein; "Hammersley Point Set"; https://mathworld.com/HammersleyPointSent.html; Wolfram MathWorld; @1999-2024; accessed Feb. 6, 2024; 2 pages.

Wong et al.; "Sampling with Hammersley and Halton Points"; Journal of Graphics Tools; vol. 2; Nov. 1997; 16 pages.

Kari et al.; "TransforMR: Pose-Aware Object Substitution for Composing Alternate Mixed Realities"; IEEE Int'l Symposium on Mixed and Augmented Reality; Oct. 2021; p. 69-79.

"Dominik Göddeke—GPGPU::Basic Math Tutorial"; https://cgvr.cs.uni-bremen.de/teacher/mpar_literatur/gpgpu_goeddecke/tutorial.html; Dominik Goddeke; @2005,2006; accessed Feb. 6, 2024; 24 pages.

Marroquim et al.; "Efficient Point-Based Rendering Using Image Reconstruction"; Eurographics Symposium on Point-Based Graphics; 2007; p. 101-108.

* cited by examiner

700

Mask the human body in an image comprised in the camera input using an input mask 702

Perform an initial sampling on an original texture of the masked image with a resolution of 16x16 704

Perform a plurality of iterations with the resolution of 16x16 at an initial level of sampling among the plurality of levels of sampling by performing a ping-pong operation, wherein the initial level of sampling comprise the initial sampling and the plurality of iterations 706

Perform other levels of sampling among the plurality of levels of sampling 708

Render a virtual character on camera input backgrounds, wherein the virtual character is rendered at locations from which a human body was removed 902

↓

Implement animation of the virtual character based on detecting facial landmarks and movements of a user in real time 904

↓

Generate sounds in real time for the virtual character based on source sounds received from the user 906

↓

Generate and output the video, wherein the user is invisible in the video, and wherein the video comprises the virtual character with animation and with the sounds 908

FIG. 9

CREATION OF VIDEOS USING VIRTUAL CHARACTERS

BACKGROUND

Communication is increasingly being conducted using Internet-based tools. The Internet-based tools may be any software or platform. Existing social media platforms enable users to communicate with each other by sharing images, videos, and other information via static app or web pages. As communication devices, such as mobile phones, become more sophisticated, people continue to desire new ways for entertainment, social networking and communication.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 7 shows another example method for creating videos using virtual characters, which may be performed by a user device in accordance with the present disclosure.

FIG. 9 shows another example method for creating videos using virtual characters, which may be performed by a user device in accordance with the present disclosure.

DETAILED DESCRIPTION OF ILLUSTRATIVE EMBODIMENTS

Virtual characters (e.g., digital humans, avatars, simulated character etc.) are simulations of human beings on computers. Virtual characters are becoming increasingly popular in today's digital ecosystem. For example, many movies, television shows, simulations, games, virtual worlds, and industries utilize virtual characters in some manner. A virtual character may simulate the movement of a real human being. For example, a human being may film a video of themselves waving at the camera. If the video is created using a virtual character, the virtual character may, in the final video, replace the one or more body parts of the human being. For example, the final video may feature a human with a virtual character hand waving at the camera. The human hand may no longer be visible. As another example, the final video may feature a human with a virtual character head waving at the camera. The human head may no longer be visible. However, it may be difficult to smoothly remove the human body part(s) in real time from the frames of the video so that the human body part(s) are no longer visible. It may be especially difficult to do so when the virtual character is smaller than or does not completely occlude human body part that it is replacing. Thus, improved techniques for video creation using virtual characters are desirable.

Figure 1:
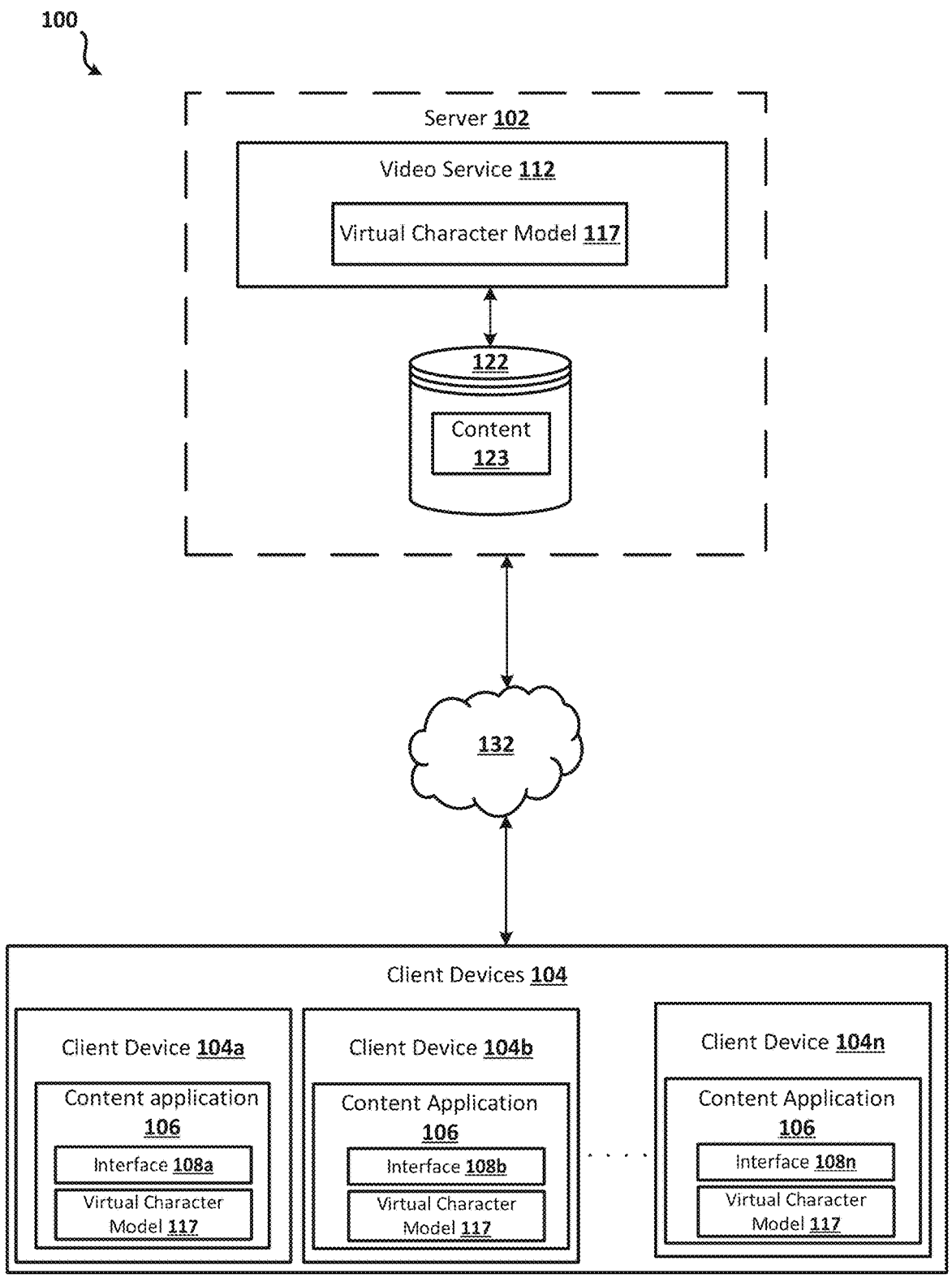
FIG. 1 shows an example system for distributing videos using virtual characters in accordance with the present disclosure.

Described herein are improved techniques for video creation using virtual characters. The improved techniques for video creation using virtual characters described herein may be utilized by a system, such as the system 100 shown in FIG. 1. FIG. 1 illustrates an example system 100 for distributing content. The system 100 may comprise a server 102 and a plurality of client devices 104a-d. The server 102 and the plurality of client devices 104a-d may communicate with each other via one or more networks 132.

The server 102 may be located at a data center, such as a single premise, or be distributed throughout different geographic locations (e.g., at several premises). The server 102 may provide the services via the one or more networks 132. The network 132 comprise a variety of network devices, such as routers, switches, multiplexers, hubs, modems, bridges, repeaters, firewalls, proxy devices, and/or the like. The network 132 may comprise physical links, such as coaxial cable links, twisted pair cable links, fiber optic links, a combination thereof, and/or the like. The network 132 may comprise wireless links, such as cellular links, satellite links, Wi-Fi links and/or the like.

The server 102 may comprise a plurality of computing nodes that host a variety of services. In an embodiment, the nodes host a video service 112. The video service 112 may comprise a content streaming service, such as an Internet protocol video streaming service. The video service 112 may be configured to distribute content 132 via a variety of transmission techniques. The video service 112 is configured to provide the content 132, such as video, audio, textual data, a combination thereof, and/or the like. The content 132 may comprise content streams (e.g., video stream, audio stream, information stream), content files (e.g., video file, audio file, text file), and/or other data. The content 132 may be stored in a database 122. For example, the video service 112 may comprise a video sharing service, a video hosting platform, a content distribution platform, a collaborative gaming platform, and/or the like.

In an embodiment, the content 132 distributed or provided by the video service 112 comprises videos. The videos may, for example, be short videos. The short videos may have a duration less than or equal to a predetermined time limit, such as one minute, five minutes, or other predetermined minutes. By way of example and without limitation, the short videos may comprise at least one, but no more than four, 15 second segments strung together. The short duration of the videos may provide viewers with quick bursts of entertainment that allow users to watch a large quantity of videos in a short time frame. Such quick bursts of entertainment may be popular on social media platforms.

The videos may comprise a pre-recorded audio overlay, such as a clip of a pre-recorded song or audio from a television show or movie. If a video comprises a pre-recorded audio overlay, the video may feature one or more individuals lip-syncing, dancing, or otherwise moving their body along with the pre-recorded audio. For example, a video may feature an individual completing a "dance challenge" to a popular song or a video may feature two individuals participating in a lip-syncing or dancing duet. As another example, a video may feature an individual completing a challenge that requires them to move his or her body in a manner that corresponds to the pre-recorded audio overlay, such as in a manner that corresponds to the beat or rhythm of the pre-recorded song featured by the pre-recorded audio overlay. Other videos may not comprise a pre-recorded audio overlay. For example, these videos may feature an individual playing sports, performing practical jokes, or giving advice, such as beauty and fashion advice, cooking tips, or home renovation tips.

In an embodiment, the content 132 may be output to different client devices 104 via the network 132. The content 132 may be streamed to the client devices 104. The content stream may be a stream of videos received from the video service 112. The plurality of client devices 104 may be configured to access the content 132 from the video service 112. In an embodiment, a client device 104 may comprise a content application 106. The content application 106 outputs (e.g., display, render, present) the content 132 to a user associated with the client device 104. The content may comprise videos, audio, comments, textual data and/or the like.

The plurality of client devices 104 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 104 may be associated with one or more users. A single user may use one or more of the plurality of client devices 104 to access the server 102. The plurality of client devices 104 may travel to a variety of locations and use different networks to access the server 102.

The video service 112 may be configured to receive input from users. The users may be registered as users of the video service 112 and may be users of the content application 106 operating on client devices 104. The user inputs may include videos created by users, user comments associated with videos, or "likes" associated with videos. The user inputs may include connection requests and user input data, such as text data, digital image data, or user content. The connection requests may comprise requests from the client devices 104a-d to connect to the video service 112. The user input data may include information, such as videos and/or user comments, that the users connected to the video service 112 want to share with other connected users of the video service 112.

The video service 112 may be able to receive different types of input from users using different types of client devices 104. For example, a user using the content application 106 on a first user device, such as a mobile phone or tablet, may be able to create and upload videos using the content application 106. A user using the content application 106 on a different mobile phone or tablet may also be able to view, comment on, or "like" videos or comments written by other users. In another example, a user using the content application 106 on a smart television, laptop, desktop, or gaming device may not be able to create and upload videos or comment on videos using the content application 106. Instead, the user using the content application 106 on a smart television, laptop, desktop, or gaming device may only be able to use the content application 106 to view videos, view comments left by other users, and "like" videos.

In an embodiment, a user may use the content application 106 on a client device 104 to create a video and upload the video to the server 102. The client devices 104 may access an interface 108a-n of the content application 106. The interface 108 may comprise an input element. For example, the input element may be configured to allow users to create the video. To create the video, the user may give the content application 106 permission to access an image capture device, such as a camera, or a microphone of the client device 104. Using the content application 106, the user may select a duration for the video or set a speed for the video, such as "slow-motion" or "speed things up."

The user may edit the video using the content application 106. The user may add one or more texts, filters, sounds, or effects, such as beauty effects, to the video. To add a pre-recorded audio overlay to the video, the user may select a song or sound clip from a sound library of the content application 106. The sound library may include different songs, sound effects, or audio clips from movies, albums, and television shows. In addition to or in lieu of adding a pre-recorded audio overlay to the video, the user may use the content application 106 to add a voice-over to the video. The voice-over may be a sound recorded by the user using a microphone of the client device 104. The user can add a text overlay to the video and may use the content application 106 to specify when they want the text overlay to appear in the video. The user may assign a caption, location tag, and one or more hashtags to the video to indicate the subject matter of the video. The content application 106 may prompt the user to select a frame of the video to use as a "cover image" for the video.

After the user has created the video, the user may use the content application 106 to upload the video to the server 102 and/or to save the video locally to the user device 104. When a user uploads the video to the server 102, they may choose whether they want the video to be viewable by all other users of the content application 106 or viewable by only a subset of the users of the content application 106. The video service 112 may store the uploaded videos and any metadata associated with the videos in one or more databases 122.

In an embodiment, a user may use the content application 106 on a client device 104 to provide input on a video. The client devices 104 may access an interface 108 of the content application 106 that allows users to provide input associated with videos. The interface 106 may comprise an input element. For example, the input element may be configured to receive input from a user, such as comments or "likes" associated with a particular video. If the input is a comment, the content application 106 may allow a user to set an emoji associated with his or her input. The content application 106 may determine timing information for the input, such as when a user wrote a comment. The content application 106 may send the input and associated metadata to the server 102. For example, the content application 106 may send a comment, an identifier of the user that wrote the comment, and the timing information for the comment to the server 102. The video service 112 may store the input and associated metadata in a database 122.

The video service 112 may be configured to output the uploaded videos and user input to other users. The users may be registered as users of the video service 112 to view videos created by other users. The users may be users of the content application 106 operating on client devices 104. The content application 106 may output (display, render, present) the videos and user comments to a user associated with a client device 104. The client devices 104 may access an interface 108 of the content application 106. The interface 108 may comprise an output element. The output element may be configured to display information about different videos so that a user can select a video to view. For example, the output element may be configured to display a plurality of cover images, captions, or hashtags associated with the videos. The output element may also be configured to arrange the videos according to a category associated with each video.

In an embodiment, the user comments associated with a video may be output to other users watching the same video. For example, all users accessing a video may view comments associated with the video. The video service 112 may output the video and the associated comments simultaneously. Comments may be output by the video service 112 in real-time or near-real-time. The content application 106 may display the videos and comments in various ways on the client device 104. For example, the comments may be displayed in an overlay above the content or in an overlay beside the content. As another example, a user that wants to view other users' comments associated with a video may need to select a button in order to view the comments. The comments may be animated when displayed. For example, the comments may be shown scrolling across the video or across the overlay.

The plurality of computing nodes may process tasks associated with the video service 112. The plurality of computing nodes may be implemented as one or more computing devices, one or more processors, one or more virtual computing instances, a combination thereof, and/or the like. The plurality of computing nodes may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

As discussed above, a user may use the content application 106 on a client device 104 to create a video and upload the video to the server 102. In an embodiment, the video created by the user via the content application 106 on the client device 104 may be a video featuring a virtual character. The virtual character may replace one or more body parts of the user. For example, the video created by the user may feature a virtual head replacing the head of the user. As another example, the video created by the user may feature a virtual hand, leg, arm, etc. replacing the hand, leg, arm, etc. of the user. The virtual body parts may resemble body parts of an animal, a monster, a cartoon character, etc. In certain embodiments, the virtual character may replace the entire human being in the video. For example, if the virtual character is a cartoon cat, the cartoon cat may replace the entire human being in the video so that the video features a cartoon cat and does not feature any human body parts.

In an embodiment, at least one of the video service 112 or the client devices 104 comprise a virtual character model 117. The virtual character model 117 may be utilized to remove one or more human body parts from a camera input so that the human body part(s) do not show in videos. For example, the virtual character model 117 may be utilized to remove one or more human body parts from a camera input and replace the one or more human body parts with a virtual character so that only the virtual character—and not the human body part(s)—show in a created video.

In embodiments, the virtual character model 117 may be configured to receive camera input comprising a human body of a user. The user may be a user of the video service 112. For example, the user may be a user associated with a client device 104. The user may initiate creation of a video, such as via the content application 106. The user may indicate that he or she wants the video to feature a virtual character. For example, the user may select a filter or effect that is associated with a virtual character. If the user indicates that he or she wants the video to feature a virtual character, the virtual character model 117 may be configured to split the received camera input into a first stream for removing one or more human body parts in the video and a second stream for animating a virtual character in the video.

The virtual character model 117 may be configured to apply an inpainting filter to the first stream. Applying the inpainting filter to the first camera input stream may cause one or more human body parts to be removed, such as in real time (i.e., while the video is being filmed) based on the camera input. The inpainting filter is configured to accelerate texture sampling. For example, the inpainting filter is configured to accelerate texture sampling by saving down-sampling and accelerating up-sampling using a pyramid ping-pong operation, such as the pyramid ping-pong operation described below in more detail with regard to FIG. 3. The inpainting filter is configured to perform a plurality of levels of sampling by doubling resolutions of previous levels of sampling and performing a ping-pong operation at each of the plurality of levels of sampling. Implementing the inpainting filter may further comprise generating a lookup table comprising precalculated Hammersley Point set.

Figure 2:
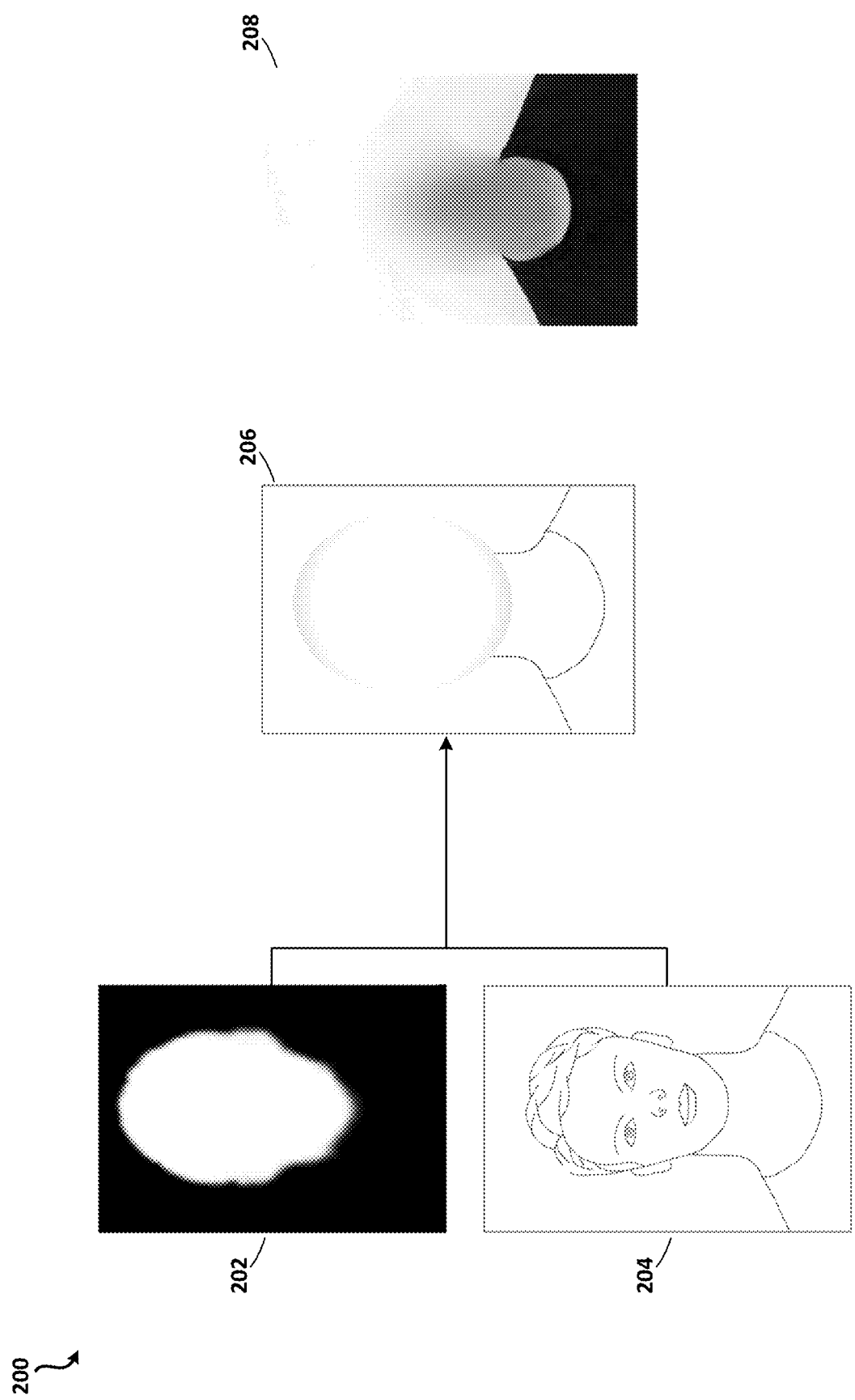
FIG. 2 shows an example diagram illustrating an inpainting filter being applied to an image in accordance with the present disclosure.

FIG. 2 shows an example diagram 200 illustrating an inpainting filter being applied to an image (e.g., an image included in camera input) in accordance with the present disclosure. Applying the inpainting filter to the first camera input stream may, for example, include masking a human body part in an image 204 comprised in the first camera input stream using an input mask. For example, to mask the human body part in the image 204, the input mask 202 may be applied to the image 204. The mask 202 may be configured to mask the head of the user featured in the image 204 to create a masked image 206. However, in some embodiments, it should be appreciated that a mask may additionally or alternatively mask other human body parts or mask an entire human body.

Applying an inpainting filter to the masked image 206 may naturally remove the masked head from the image 204. For example, as shown in an image 208, a masked head of a user disappears after applying the inpainting filter. The inpainting filter is configured to accelerate texture sampling, thereby enabling to remove human body parts in real time from a camera input stream. An inpainting filter in accordance with the present disclosure does not perform down-sampling of the texture. The inpainting filter accelerates up-sampling using a pyramid ping-pong operation.

The inpainting filter may perform a plurality of levels of sampling based on the masked image 206. Performing the plurality of levels of sampling based on the masked image 206 may comprise performing an initial level of sampling with a low resolution. For example, performing the initial level of sampling may comprise performing an initial sampling on the original texture of the masked image 206 with a resolution of 16×16. Performing the initial level of sampling may further comprise performing a plurality of iterations by performing a ping-pong operation.

Performing the plurality of levels of sampling may further comprise upsampling texture resulted from a previous level of sampling. The higher resolution may, for example, be twice a resolution of the previous level of sampling. In embodiments, performing the plurality of levels of sampling may comprise performing a plurality of iterations at a current level of sampling by performing the ping-pong operation. The ping-pong operation minimizes read/write on the same texture. The ping-pong operation is discussed below in more detail with regard to FIG. 3.

Figure 3:
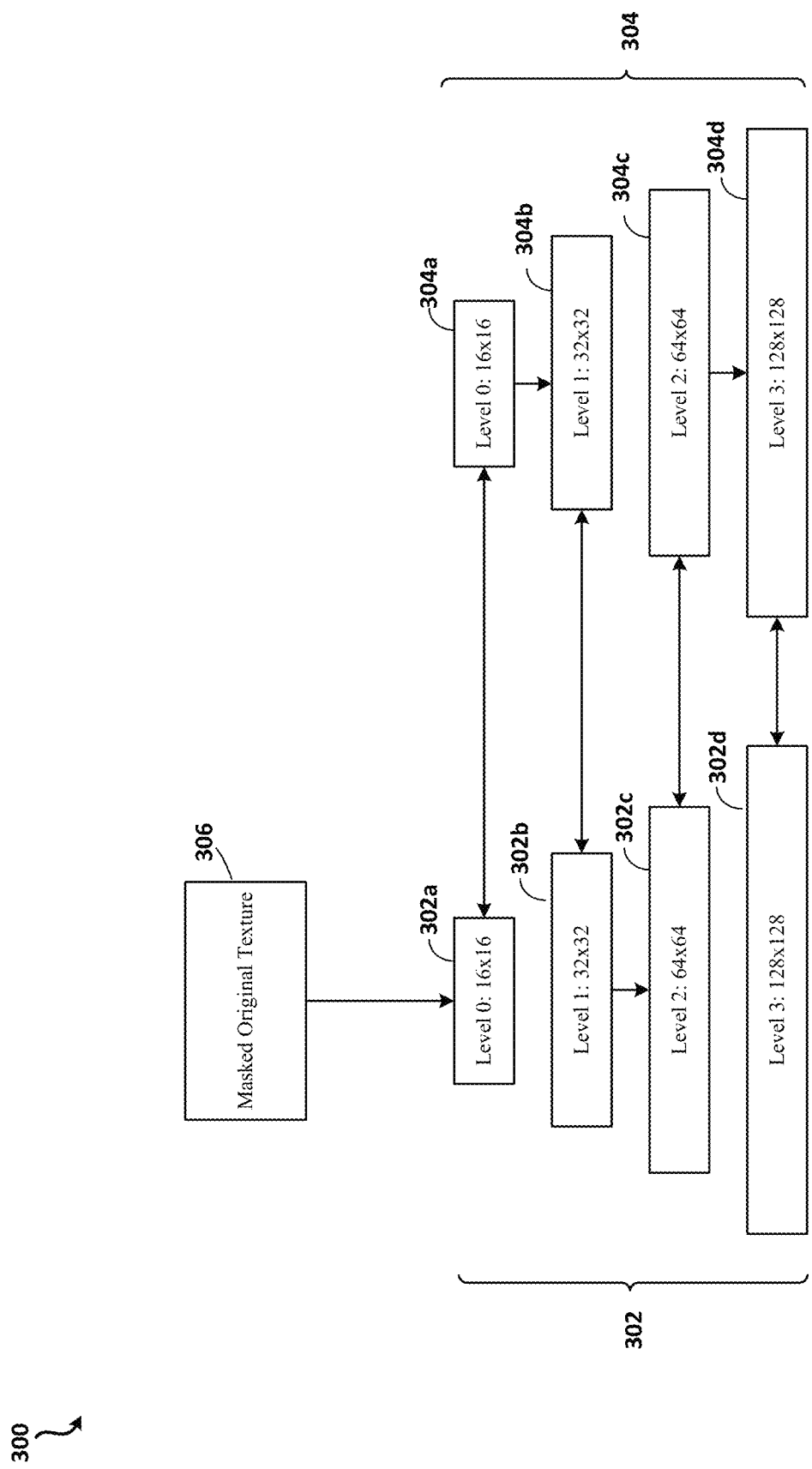
FIG. 3 shows an example diagram illustrating a ping-pong operation in accordance with the present disclosure.

FIG. 3 shows an example diagram 300 illustrating a pyramid ping-pong operation utilized by an inpainting filter in accordance with the present disclosure. The inpainting filter in accordance with the present disclosure accelerates texture sampling by saving down-sampling. The inpainting filter also accelerates up-sampling using a pyramid ping-pong operation. For example, the pyramid ping-pong operation comprises performing a plurality of levels of sampling by doubling resolutions of previous levels of sampling and performing a ping-pong operation at each of the plurality of levels of sampling. Utilizing the ping-pong operation can prevent from copying a lot of textures in the Graphics Processing Unit (GPU) and may reduce the cost of rendering the pipeline.

The pyramid ping-pong operation may comprise a plurality of levels of texture sampling. In an example, the diagram 300 includes four levels of texture sampling: Level 0 (level zero), Level 1 (level one), Level 2 (level two), and Level 3 (level three). Each level may comprise a plurality of iterations by performing a ping-pong operation. The ping-pong operation may comprise ping parts 302 and pong parts 304. Each level may be associated with a different resolution, with the resolution doubling at each level increase. For example, level zero may be associated with a 16×16 resolution, level one may be associated with a 32×32 resolution, level two may be associated with a 64×64 resolution, level three may be associated with a 128×128 resolution, and so on.

The resolution associated with the last level may be the closest power of two to the resolution of the input masked texture (e.g., 512×512 for 720p and 540p, 256×256 for 360p, etc.). The resolution associated with the first level (e.g., level zero) may be half of the resolution of the next level (e.g., level one). The minimum resolution associated with level zero may be 16×16 to limit the influence of the averaged value of the whole image.

In embodiments, the number of levels may be determined by an input resolution. For example, if an input resolution is 720p, then the levels of the pyramid (from level zero upwards) may be: 16×16, 32×32, 64×64, 128×128, 256×256, 512×512. In another example, the input resolution is instead 360p, then the levels of the pyramid (from level zero upwards) may be: 16×16, 32×32, 64×64, 128×128, 256×256.

Each level may perform iterations of a Laplacian kernel to converge the masked region. The number of iterations may, for example, be determined by a quality setting. A low-quality setting has fewer iterations to converge an initial level and copy the results to next level with interpolation. A high-quality setting has as many iterations as needed to converge the initial level and perform smoothing on the next level for better results near the region border. For example, the number of iterations for a low-quality setting may be 5 and the number of iterations for a high-quality setting may be 11. When executed, the initial level may be fully converged in the masked region. Each current level may then sample the previous level (for example, Level 1 will sample from Level 0, and so on) as a base filling in a first run, then each level may perform a number of Laplacian iterations according to a given quality.

In one example, as illustrated in FIG. 3, Level 0 may comprise an initial sampling on the masked original texture 306 with a resolution of 16×16. Level 0 sampling may further comprise a plurality of iterations with the resolution of 16×16 by performing the ping-pong operation. The ping-pong operation at Level 0 comprises ping parts 302a and pong parts 304a. Level 1 may up-sample texture resulted from the last iteration of Level 0 with a higher resolution of 32×32. Level 1 may further perform iterations with the resolution of 32×32, comprising ping parts 302b and pong parts 304b. Level 2 may up-sample texture resulted from the last iteration of Level 1 with a resolution of 64×64. Level 2 may further perform iterations with the resolution of 64×64 comprising the ping parts 302c and the pong parts 304c. Level 3 may upsample texture resulted from the last iteration of Level 2 with a resolution of 128×128. Level 2 may further perform iterations with the resolution of 128×128 comprising the ping parts 302d and the pong parts 304d. During the pyramid ping-pong process, copying texture happens only for the very initial sampling on the masked original texture and there is no copying texture from previous levels. The pyramid ping-pong operation accelerates texture sampling by performing up-sampling only. The pyramid ping-pong operation further accelerates texture sampling by saving copying textures in the GPU and reducing the cost of rendering pipeline.

In other embodiments, applying the inpainting filter may further comprise generating a lookup table by pre-calculating Hammersley Point set to further accelerate the sampling process. Pre-calculating the Hammersley Sampling Point set may optimize the GPU code to allow it to run in a low-end device with a performance comparable to C++. Sampling points may be jittered by adding an extra random number. An initial sampling may be performed on the masked original texture. For the remainder of the iterations 2-N, a ping-pong operation may be performed at the same level on the pyramid to make sure it is smoothly blurred. For the first iteration at level one, the previous level (Level 0)'s result (i.e., 16×16 textures) may be upsampled and then a ping-pong operation may be performed at level one until it is smoothly blurred. This process may repeat iteratively for all levels.

Referring back to FIG. 1, after the inpainting filter is applied to the first camera input stream to remove the human body in real time from the camera input, the output from the inpainting filter may be utilized to generate camera input backgrounds. For example, the output of the inpainting filter may be blended with original images comprised in the camera input stream to generate camera input backgrounds.

In embodiments, the virtual character model 117 may additionally or alternatively utilize human body input to drive a 3D virtual character. For example, the virtual character model 117 may render an animated 3D virtual character onto the one or more camera input backgrounds, where the real human body part is erased. Rendering the virtual character on the camera input backgrounds may comprise rendering the virtual character at locations on the camera input backgrounds where the human body part(s) were removed. The virtual character model 117 may additionally or alternatively implementing animation of the virtual character based on detecting facial landmarks and movements of the user in real time. The virtual character model 117 may additionally or alternatively generate sounds in real time for the virtual character based on source sounds received from the user. The virtual character model 117 may additionally or alternatively generate and/or output the final video. As described above, one or more body parts or the entire human body of the user may be invisible in the final video. In the final video, the user may be naturally replaced by the animated virtual character with the sounds.

Figure 4:
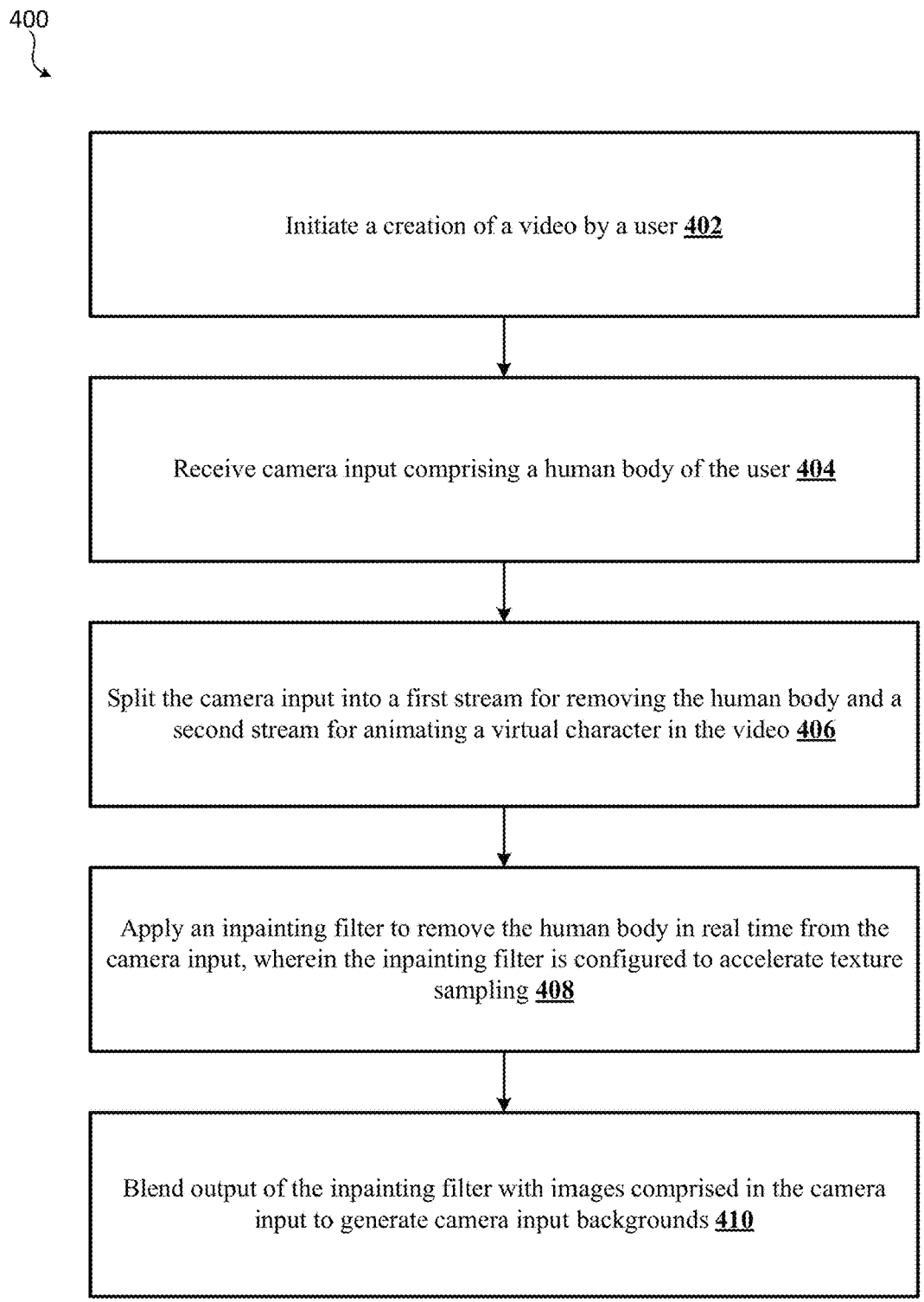
FIG. 4 shows an example method for creating videos using virtual characters, which may be performed by a user device in accordance with the present disclosure.

FIG. 4 illustrates an example process 400 performed by the video service 112 and/or the client device 104. The video service 112 and/or the client device 104 may perform the process 400 to create videos using virtual characters, such as videos for upload to the video service 112. Once uploaded to the video service 112, the videos may be viewed by users of the video service. Although depicted as a sequence of operations in FIG. 4, those of ordinary skill in the art will appreciate that various embodiments may add, remove, reorder, or modify the depicted operations.

At 402, creation of a video may be initiated. Creation of the video may be triggered by a user. The user may be a user of a video service (i.e., the video service 112). For example, the user may be a user associated with a client device (i.e., client device 104). The user may initiate creation of a video, such as via a content application (i.e., the content application 106). The user may indicate that he or she wants the video to feature a virtual character. For example, the user may select a filter or effect that is associated with a virtual character.

At 404, camera input comprising a human body of the user may be received. For example, camera input may be received from a camera of the client device. The human body of the user may, for example, include any number of body parts of the user. For example, the human body of the user may include the entire body of the user, or one or more body parts of the user. If the user indicates that he or she wants the video to feature a virtual character, the received camera input may be split into a first stream for removing one or more human body parts in the video and a second stream for animating a virtual character in the video. At 406, the camera input may be split into a first stream for removing the human body and a second stream for animating a virtual character in the video.

At 408, an inpainting filter may be applied to remove the human body in real time from the camera input. The inpainting filter may be configured to accelerate texture sampling. For example, applying the inpainting filter may accelerate sampling of texture using a pyramid ping-pong operation, such as the pyramid ping-pong operation described above with regard to FIG. 3. At 410, output of the inpainting filter may be blended with images comprised in the camera input to generate camera input backgrounds. For example, a result from the last iteration of the last level of the pyramid ping-pong operation may be blended with an image comprised in the camera input, to generate a camera input background for use of creating the video.

Figure 5:
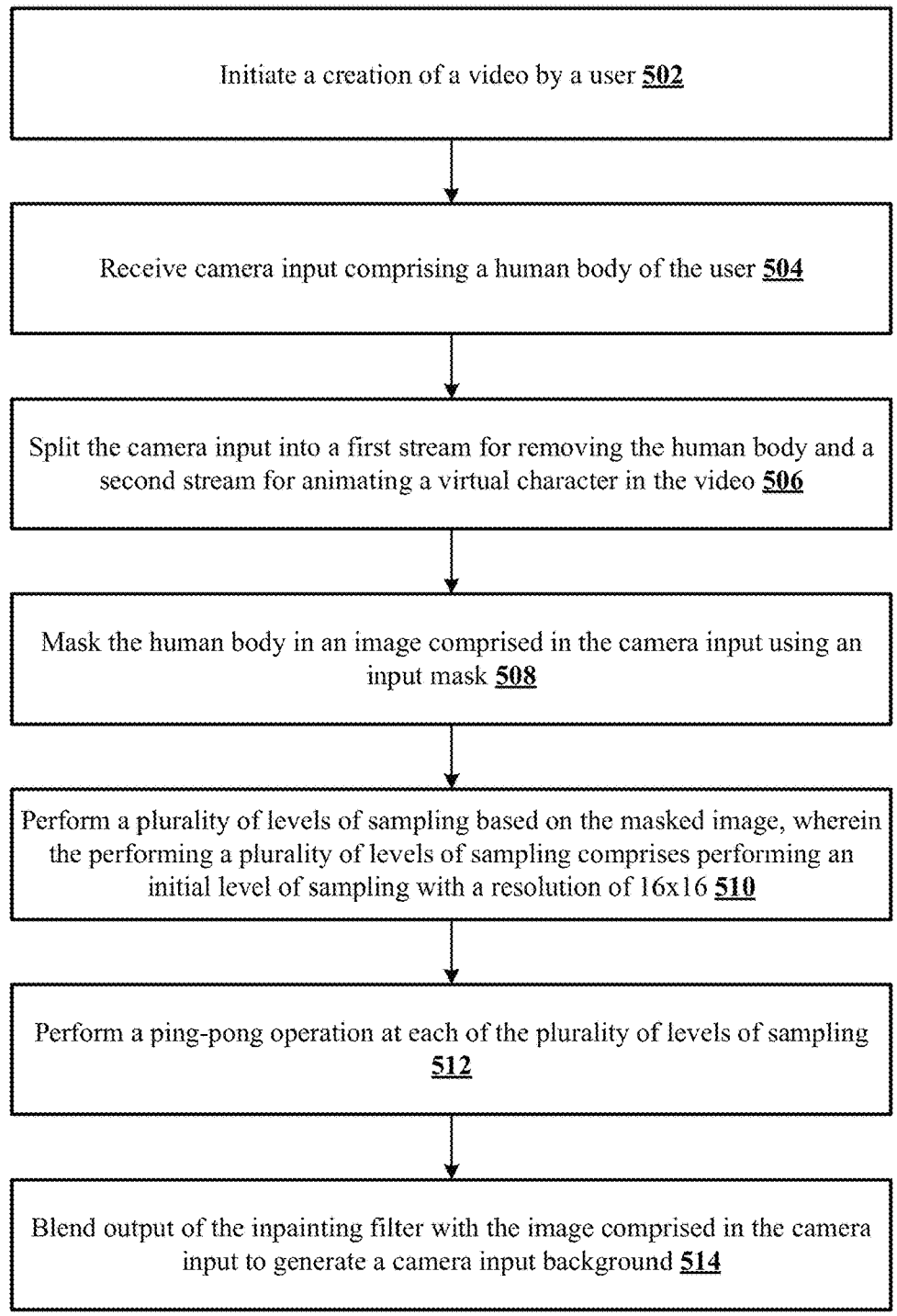
FIG. 5 shows another example method for creating videos using virtual characters, which may be performed by a user device in accordance with the present disclosure.

FIG. 5 illustrates an example process 500 performed by the video service 112 and/or the client device 104. The video service 112 and/or the client device 104 may perform the process 500 to create videos using virtual characters, such as videos for upload to the video service 112. Once uploaded to the video service 112, the videos may be viewed by users of the video service. Although depicted as a sequence of operations in FIG. 5, those of ordinary skill in the art will appreciate that various embodiments may add, remove, reorder, or modify the depicted operations.

At 502, creation of a video may be initiated. Creation of the video may be triggered by a user. The user may be a user of a video service (i.e., the video service 112). For example, the user may be a user associated with a client device (i.e., client device 104). The user may initiate creation of a video, such as via a content application (i.e., the content application 106). The user may indicate that he or she wants the video to feature a virtual character. For example, the user may select a filter or effect that is associated with a virtual character.

At 504, camera input comprising a human body of the user may be received. For example, camera input may be received from a camera of the client device. The human body of the user may, for example, include any number of body parts of the user. For example, the human body of the user may include the entire body of the user, or one or more body parts of the user. If the user indicates that he or she wants the video to feature a virtual character, the received camera input may be split into a first stream for removing one or more human body parts in the video and a second stream for animating a virtual character in the video. At 506, the camera input may be split into a first stream for removing the human body and a second stream for animating a virtual character in the video.

An inpainting filter may be applied to remove the human body in real time from the camera input. To apply the inpainting filter, an image (e.g., an image included in the camera input) may be masked using an input mask. At 508, the human body may be masked in an image comprised in the camera input using an input mask. Masking the image may comprise creating a copy of the destination texture. The missing region may be set to zero on the copy of the destination texture. The input mask may be resampled to a resolution of the destination texture and may be stored in an alpha channel of the destination texture copy.

Applying the mask to the image may, for example, create a masked image. The human body may be masked in the masked image. A 510, a plurality of levels of sampling may be performed based on the masked image. Performing the plurality of levels of sampling based on the masked image may comprise performing an initial level of sampling with a resolution of 16×16. Each level may be associated with a different image resolution, with the resolution doubling at each level increase. For example, level zero of each of the pyramids may be associated with a 16×16 resolution, level one of each of the pyramids may be associated with a 32×32 resolution, level two of each of the pyramids may be associated with a 64×64 resolution, level three of each of the pyramids may be associated with a 128×128 resolution, and so on.

At 512, a ping-pong operation may be performed at each level of sampling. Utilizing the ping-pong operation can prevent from copying a lot of textures in the GPU and reduce the cost of rendering pipeline. In one example, as illustrated in FIG. 3, Level 0 performs an initial sampling on the masked original texture with a resolution of 16×16. Then Level 0 may perform a plurality of iterations with the resolution of 16×16 by performing the ping-pong operation, and the ping-pong operation at Level 0 comprises ping parts 302*a* and pong parts 304*a*. Next level may up-sample texture resulted from the last iteration of the previous level with a higher resolution (e.g., twice a resolution of the previous level). The next level may then perform a plurality of iterations with the same resolution by performing the ping-pong operation. The ping-pong operation minimizes read/write on the same texture. By utilizing the ping-pong operation, copying texture happens only for the very initial sampling on the masked original texture and there is no copying texture from previous levels. The ping-pong operation accelerates texture sampling by saving copying textures in the GPU and reducing the cost of rendering pipeline.

At 514, output of the inpainting filter may be blended with the image comprised in the camera input to generate a camera input background. For example, a result from the last iteration of the last level of the pyramid ping-pong operation may be blended with an image comprised in the camera input, to generate a camera input background for use of creating the video.

Figure 6:
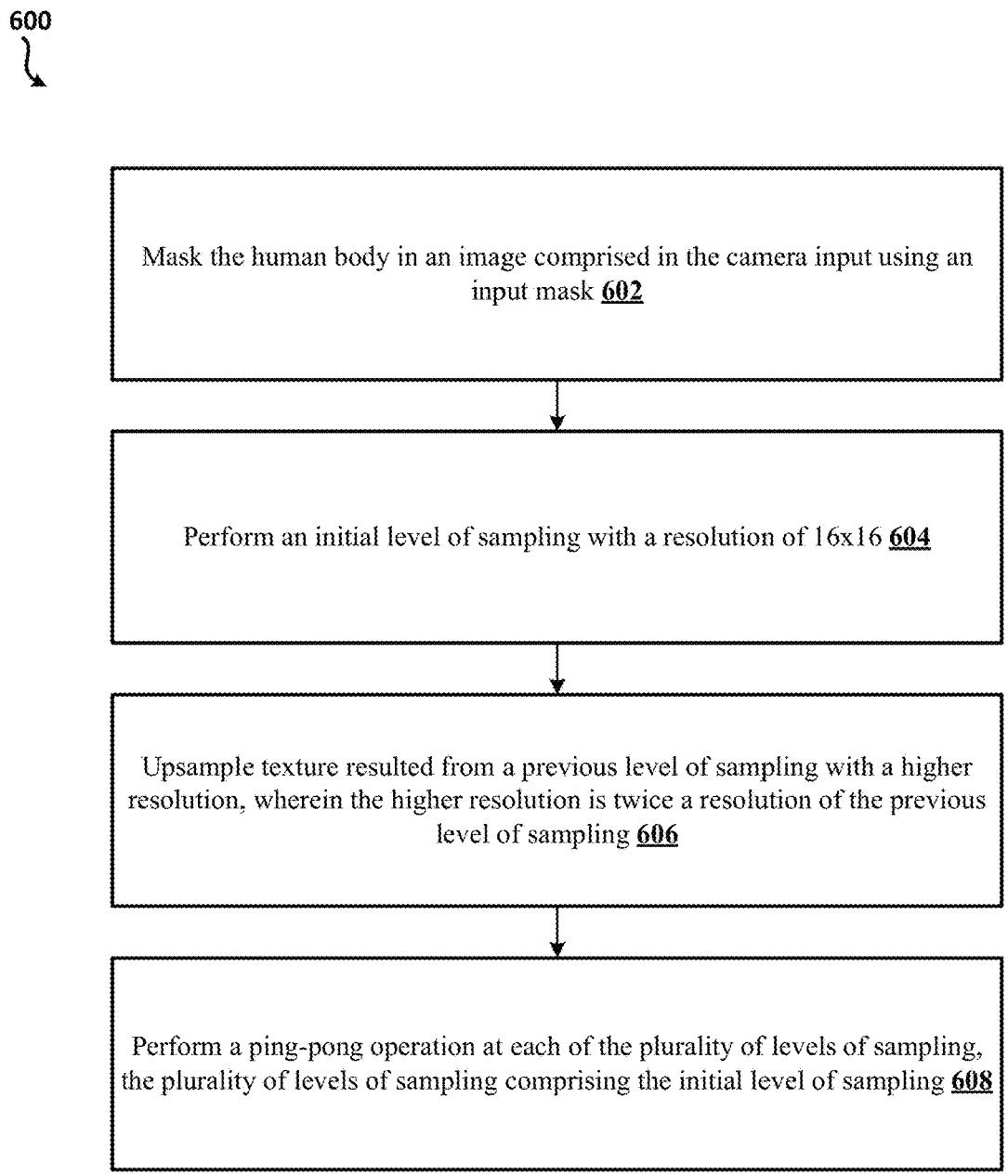
FIG. 6 shows another example method for creating videos using virtual characters, which may be performed by a user device in accordance with the present disclosure.

FIG. 6 illustrates an example process 600 performed by the video service 112 and/or the client device 104. The video service 112 and/or the client device 104 may perform the process 600 to create videos using virtual characters, such as videos for upload to the video service 112. Once uploaded to the video service 112, the videos may be viewed by users of the video service. Although depicted as a sequence of operations in FIG. 6, those of ordinary skill in the art will appreciate that various embodiments may add, remove, reorder, or modify the depicted operations.

As described above, an inpainting filter may be applied to remove a human body in real time from the camera input. To apply the inpainting filter, an image (e.g., an image included in the camera input) may be masked using an input mask. At 602, a human body in an image comprised in the camera input may be masked using an input mask. Masking the image may comprise creating a copy of the destination texture. The missing region may be set to zero on the copy of the destination texture. The input mask may be resampled to a resolution of the destination texture and may be stored in an alpha channel of the destination texture copy.

Applying the mask to the image may, for example, create a masked image. The human body may be masked or blurred in the masked image. Applying the inpainting filter may comprise performing a plurality of levels of sampling based on the masked image. Performing the plurality of levels of sampling based on the masked image may comprise performing an initial level of sampling with a resolution of 16×16. At 604, an initial level of sampling may be performed with a resolution of 16×16. At 606, texture resulting from a previous level of sampling may be upsampled with a higher resolution. For example, the higher resolution may be twice a resolution of the previous level of sampling.

At 608, a ping-pong operation may be performed at each of the plurality of levels of sampling. The plurality of levels of sampling may comprise the initial level of sampling. Utilizing the ping-pong operation can prevent from copying of a lot of textures in the GPU and reduce the cost of rendering pipeline. The ping-pong operation minimizes read/write on the same texture. By utilizing the ping-pong operation, copying texture happens only for the initial sampling on the masked original texture and there is no copying texture from previous levels. The ping-pong operation accelerates texture sampling by saving copying textures in the GPU and reducing the cost of rendering pipeline.

FIG. 7 illustrates an example process 700 performed by the video service 112 and/or the client device 104. The video service 112 and/or the client device 104 may perform the process 700 to create videos using virtual characters, such as videos for upload to the video service 112. Once uploaded to the video service 112, the videos may be viewed by users of the video service. Although depicted as a sequence of operations in FIG. 7, those of ordinary skill in the art will appreciate that various embodiments may add, remove, reorder, or modify the depicted operations.

As described above, an inpainting filter may be applied to remove a human body in real time from the camera input. To apply the inpainting filter, an image (e.g., an image included in the camera input) may be masked using an input mask. At 702, a human body may be masked in an image comprised in the camera input using an input mask. Masking the image may comprise creating a copy of the destination texture. The missing region may be set to zero on the copy of the destination texture. The input mask may be resampled to a resolution of the destination texture and may be stored in an alpha channel of the destination texture copy.

Applying the mask to the image may, for example, create a masked image. The human body may be masked in the masked image. Applying the inpainting filter may comprise performing a plurality of levels of sampling based on the masked image. Performing the plurality of levels of sampling based on the masked image may comprise performing an initial level of sampling with a resolution of 16×16. At 704, an initial sampling on the original texture of the masked image may be performed with a resolution of 16×16.

At 706, a plurality of iterations may be performed with the same resolution of 16×16 at an initial level of sampling among the plurality of levels of sampling by performing a ping-pong operation. The initial level of sampling comprises the initial sampling and the plurality of iterations with the same resolution of 16×16. The plurality of iterations at the initial level of sampling are performed using a ping-pong operation. The ping-pong operation can accelerate texture sampling by saving copying textures in the GPU and reducing the cost of rendering pipeline.

At 708, other levels of sampling among the plurality of levels of sampling may be performed. The number of levels may be determined by an input resolution. For example, if an input resolution is 720p, then the levels (from level zero upwards) may be: 16×16, 32×32, 64×64, 128×128, 256×256, 512×512. In another example, the input resolution is instead 360p, then the levels of the pyramid (from level zero upwards) may be: 16×16, 32×32, 64×64, 128×128, 256×256. Each level of sampling comprises upsampling texture resulted from the last iteration of a previous level with a resolution higher than the previous level's resolution (e.g., twice a resolution of the previous level), and then performs a plurality of iterations with the same resolution by utilizing the ping-pong operation. The ping-pong operation minimizes read/write on the same texture. The ping-pong operation accelerates texture sampling by saving copying textures in the GPU and reducing the cost of rendering pipeline.

Figure 8:
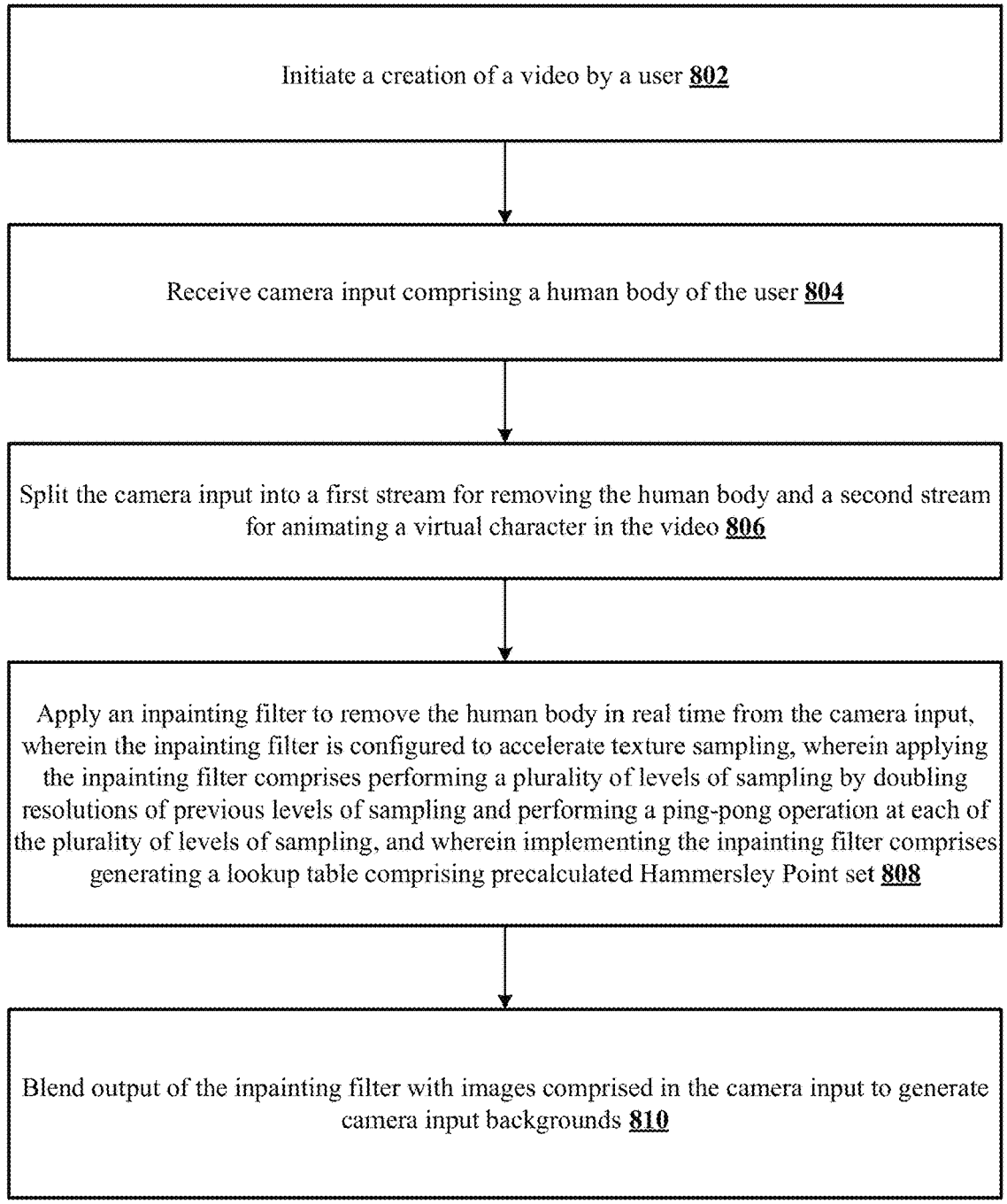
FIG. 8 shows another example method for creating videos using virtual characters, which may be performed by a user device in accordance with the present disclosure.

FIG. 8 illustrates an example process 800 performed by the video service 112 and/or the client device 104. The video service 112 and/or the client device 104 may perform the process 800 to create videos using virtual characters, such as videos for upload to the video service 112. Once uploaded to the video service 112, the videos may be viewed by users of the video service. Although depicted as a sequence of operations in FIG. 8, those of ordinary skill in the art will appreciate that various embodiments may add, remove, reorder, or modify the depicted operations.

At 802, creation of a video may be initiated. Creation of the video may be triggered by a user. The user may be a user of a video service (i.e., the video service 112). For example, the user may be a user associated with a client device (i.e., client device 104). The user may initiate creation of a video, such as via a content application (i.e., the content application 106). The user may indicate that he or she wants the video to feature a virtual character. For example, the user may select a filter or effect that is associated with a virtual character.

At 804, camera input comprising a human body of the user may be received. For example, camera input may be received from a camera of the client device. The human body of the user may, for example, include any number of body parts of the user. For example, the human body of the user may include the entire body of the user, or one or more body parts of the user. If the user indicates that he or she wants the video to feature a virtual character, the received camera input may be split into a first stream for removing one or more human body parts in the video and a second stream for animating a virtual character in the video. At 806, the camera input may be split into a first stream for removing the human body and a second stream for animating a virtual character in the video.

At 808, an inpainting filter may be applied to remove the human body in real time from the camera input. The inpainting filter may be configured to accelerate texture sampling. For example, applying the inpainting filter may accelerate texture sampling by saving down-sampling and accelerate up-sampling using a pyramid ping-pong operation, such as the pyramid ping-pong operation described above with regard to FIG. 3. Applying the inpainting filter may comprise performing a plurality of levels of sampling by doubling resolutions of previous levels of sampling and performing a ping-pong operation at each of the plurality of levels of sampling. Implementing the inpainting filter may comprise generating a lookup table comprising precalculated Hammersley Point set.

At 810, output of the inpainting filter may be blended with images comprised in the camera input to generate camera input backgrounds. For example, a result from the last iteration of the last level of the pyramid ping-pong operation may be blended with a corresponding original image comprised in the camera input, to generate a camera input background for use of creating the video.

FIG. 9 illustrates an example process 900 performed by the video service 112 and/or the client device 104. The video service 112 and/or the client device 104 may perform the process 900 to create videos using virtual characters, such as videos for upload to the video service 112. Once uploaded to the video service 112, the videos may be viewed by users of the video service. Although depicted as a sequence of operations in FIG. 9, those of ordinary skill in the art will appreciate that various embodiments may add, remove, reorder, or modify the depicted operations.

As described above, human body input may be utilized to drive a 3D virtual character. For example, an animated 3D virtual character may be rendered onto one or more camera input backgrounds generated using the techniques described above. At 902, a virtual character may be rendered on camera input backgrounds. The virtual character may be rendered at locations from which a human body was removed or erased. At 904, animation of the virtual character may be implemented based on detecting facial landmarks and movements of the user in real time. At 906, sounds may operationally be generated in real time for the virtual character based on source sounds received from a user creating the video. At 908, the final video may be generated and/or output. In the final video, the one or more body parts or the entire human body of the user may be naturally replaced by the animated virtual character with the generated sounds.

Figure 10:
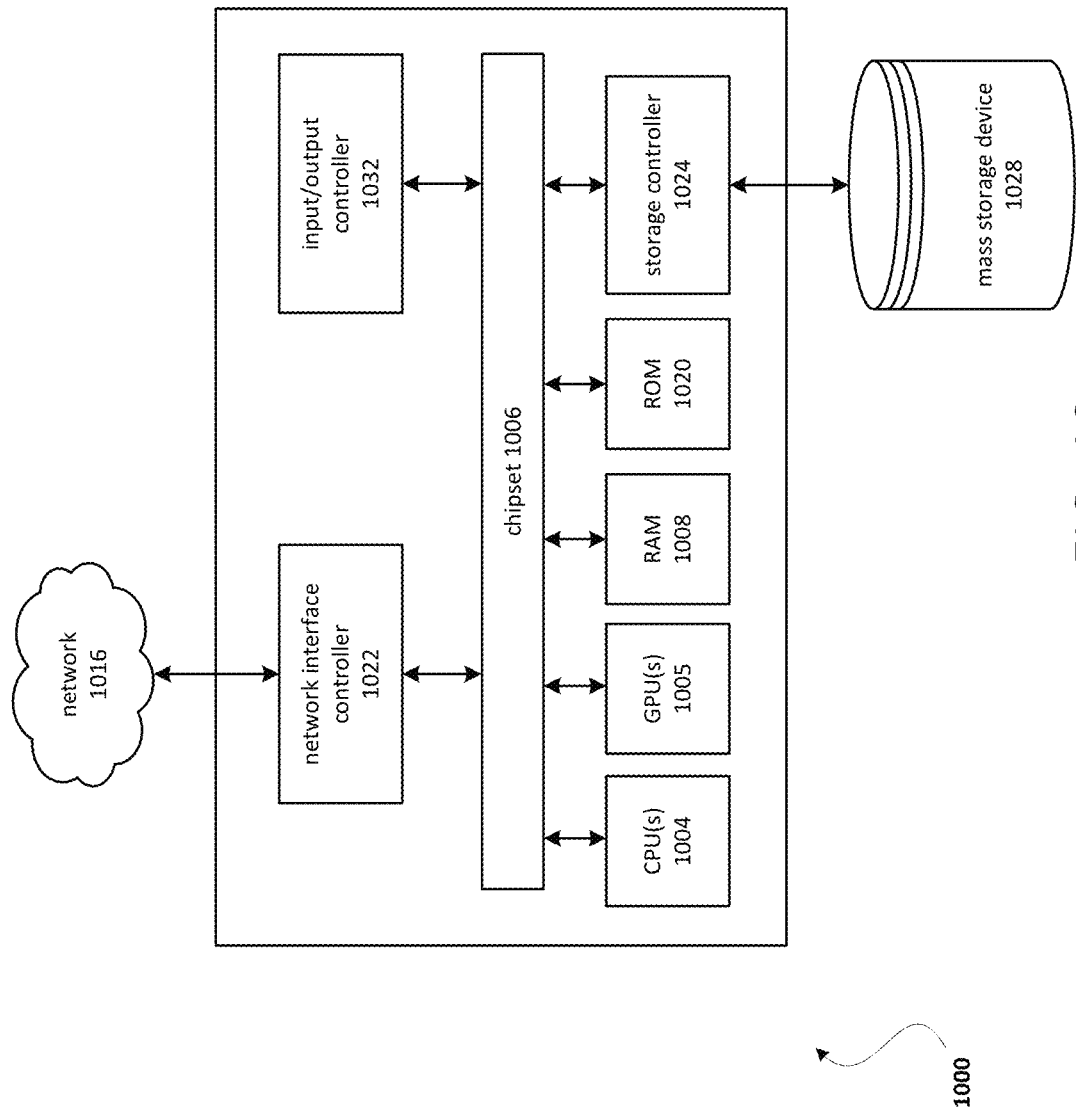
FIG. 10 shows an example computing device which may be used to perform any of the techniques disclosed herein.

FIG. 10 illustrates a computing device that may be used in various aspects, such as the services, networks, modules, and/or devices depicted in FIG. 1. With regard to the example architecture of FIG. 1, the video service 112, the virtual character model 117, and/or client devices 104 may each be implemented by one or more instance of a computing device 1000 of FIG. 10. The computer architecture shown in FIG. 10 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1000 may include a baseboard, or "motherboard," which is a printed circuit board to which a multitude of components or devices may be connected by way of a system bus or other electrical communication paths. One or more central processing units (CPUs) 1004 may operate in conjunction with a chipset 1006. The CPU(s) 1004 may be standard programmable processors that perform arithmetic and logical operations necessary for the operation of the computing device 1000.

The CPU(s) 1004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1004 may be augmented with or replaced by other processing units, such as GPU(s) 1005. The GPU(s) 1005 may comprise processing units specialized for but not necessarily limited to highly parallel computations, such as graphics and other visualization-related processing.

A chipset 1006 may provide an interface between the CPU(s) 1004 and the remainder of the components and devices on the baseboard. The chipset 1006 may provide an interface to a random-access memory (RAM) 1008 used as the main memory in the computing device 1000. The chipset 1006 may further provide an interface to a computer-readable storage medium, such as a read-only memory (ROM) 1020 or non-volatile RAM (NVRAM) (not shown), for storing basic routines that may help to start up the computing device 1000 and to transfer information between the various components and devices. ROM 1020 or NVRAM may also store other software components necessary for the operation of the computing device 1000 in accordance with the aspects described herein.

The computing device 1000 may operate in a networked environment using logical connections to remote computing nodes and computer systems through local area network (LAN). The chipset 1006 may include functionality for providing network connectivity through a network interface controller (NIC) 1022, such as a gigabit Ethernet adapter. A NIC 1022 may be capable of connecting the computing device 1000 to other computing nodes over a network 1016. It should be appreciated that multiple NICs 1022 may be present in the computing device 1000, connecting the computing device to other types of networks and remote computer systems.

The computing device 1000 may be connected to a mass storage device 1028 that provides non-volatile storage for the computer. The mass storage device 1028 may store system programs, application programs, other program modules, and data, which have been described in greater detail herein. The mass storage device 1028 may be connected to the computing device 1000 through a storage controller 1024 connected to the chipset 1006. The mass storage device 1028 may consist of one or more physical storage units. The mass storage device 1028 may comprise a management component 1010. A storage controller 1024 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1000 may store data on the mass storage device 1028 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1028 is characterized as primary or secondary storage and the like.

For example, the computing device 1000 may store information to the mass storage device 1028 by issuing instructions through a storage controller 1024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1000 may further read information from the mass storage device 1028 by detecting the physical states or characteristics of one or more particular locations within the physical storage units.

In addition to the mass storage device 1028 described above, the computing device 1000 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1000.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1028 depicted in FIG. 10, may store an operating system utilized to control the operation of the computing device 1000. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1028 may store other system or application programs and data utilized by the computing device 1000.

The mass storage device 1028 or other computer-readable storage media may also be encoded with computer-executable instructions, which, when loaded into the computing device 1000, transforms the computing device from a general-purpose computing system into a special-purpose computer capable of implementing the aspects described herein. These computer-executable instructions transform the computing device 1000 by specifying how the CPU(s) 1004 transition between states, as described above. The computing device 1000 may have access to computer-readable storage media storing computer-executable instructions, which, when executed by the computing device 1000, may perform the methods described herein.

A computing device, such as the computing device 1000 depicted in FIG. 10, may also include an input/output controller 1032 for receiving and processing input from a number of input devices, such as a keyboard, a mouse, a touchpad, a touch screen, an electronic stylus, or other type of input device. Similarly, an input/output controller 1032 may provide output to a display, such as a computer monitor, a flat-panel display, a digital projector, a printer, a plotter, or other type of output device. It will be appreciated that the computing device 1000 may not include all of the components shown in FIG. 10, may include other components that are not explicitly shown in FIG. 10, or may utilize an architecture completely different than that shown in FIG. 10.

As described herein, a computing device may be a physical computing device, such as the computing device 1000 of FIG. 10. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of creating videos using virtual characters, comprising:
   initiating a creation of a video by a user;
   receiving camera input comprising a human body of the user;
   splitting the camera input into a first stream for removing the human body and a second stream for animating a virtual character in the video;
   applying an inpainting filter to remove the human body in real time from the camera input while the video is being recorded, wherein the inpainting filter is configured to accelerate texture sampling, wherein applying the inpainting filter comprises:
      masking the human body in an image comprised in the camera input using an input mask, performing a plurality of levels of sampling based on the masked image, wherein the performing a plurality of levels of sampling comprises performing an initial level of sampling with a predetermined resolution and
      performing a ping-pong operation at each of the plurality of levels of sampling; and
   blending output of the inpainting filter with images comprised in the camera input to generate camera input backgrounds.

2. The method of claim 1, wherein the performing an initial level of sampling further comprises:
   performing an initial sampling on original texture of the masked image with the resolution of 16×16; and
   performing a plurality of iterations at the initial level of sampling by performing the ping-pong operation.

3. The method of claim 1, wherein the performing a plurality of levels of sampling further comprises:
   upsampling texture resulted from a previous level of sampling with a higher resolution, wherein the higher resolution is twice a resolution of the previous level of sampling; and
   performing a plurality of iterations at a current level of sampling by performing the ping-pong operation.

4. The method of claim 1, wherein implementing the inpainting filter comprises:
   generating a lookup table, wherein the lookup table comprises precalculated Hammersley Point set.

5. The method of claim 1, further comprising:
   rendering the virtual character on the camera input backgrounds, wherein the virtual character is rendered at locations from which the human body was removed.

6. The method of claim 5, further comprising:
   implementing animation of the virtual character based on detecting facial landmarks and movements of the user in real time.

7. The method of claim 5, further comprising:
   generating sounds in real time for the virtual character based on source sounds received from the user.

8. The method of claim 7, further comprising:
   generating and outputting the video, wherein the user is invisible in the video, and wherein the video comprises the virtual character with animation and with the sounds.

9. A system, comprising:
   at least one processor in communication with at least one memory, the at least one memory comprising computer-readable instructions that upon execution by the at least one processor configure the system to perform operations comprising:
      initiating a creation of a video by a user;
      receiving camera input comprising a human body of the user;
      splitting the camera input into a first stream for removing the human body and a second stream for animating a virtual character in the video;
      applying an inpainting filter to remove the human body in real time from the camera input while the video is being recorded, wherein the inpainting filter is configured to accelerate texture sampling, wherein applying the inpainting filter comprises:
         masking the human body in an image comprised in the camera input using an input mask,
         performing a plurality of levels of sampling based on the masked image, wherein the performing a plurality of levels of sampling comprises performing an initial level of sampling with a predetermined resolution, and
         performing a ping-pong operation at each of the plurality of levels of sampling; and
      blending output of the inpainting filter with images comprised in the camera input to generate camera input backgrounds.

10. The system of claim 9, wherein the performing an initial level of sampling further comprises:
    performing an initial sampling on original texture of the masked image with the resolution of 16×16; and
    performing a plurality of iterations at the initial level of sampling by performing the ping-pong operation.

11. The system of claim 9, wherein the performing a plurality of levels of sampling further comprises:
    upsampling texture resulted from a previous level of sampling with a higher resolution, wherein the higher resolution is twice a resolution of the previous level of sampling; and
    performing a plurality of iterations at a current level of sampling by performing the ping-pong operation.

12. The system of claim 9, wherein implementing the inpainting filter comprises:
    generating a lookup table, wherein the lookup table comprises precalculated Hammersley Point set.

13. The system of claim 9, the operations further comprising:
    rendering the virtual character on the camera input backgrounds, wherein the virtual character is rendered at locations from which the human body was removed;
    implementing animation of the virtual character based on detecting facial landmarks and movements of the user in real time;
    generating sounds in real time for the virtual character based on source sounds received from the user; and
    generating and outputting the video, wherein the user is invisible in the video, and wherein the video comprises the virtual character with animation and with the sounds.

14. A non-transitory computer-readable storage medium, storing computer-readable instructions that upon execution by a processor cause the processor to implement operations comprising:
    initiating a creation of a video by a user;
    receiving camera input comprising a human body of the user;

splitting the camera input into a first stream for removing the human body and a second stream for animating a virtual character in the video;

applying an inpainting filter to remove the human body in real time from the camera input while the video is being recorded, wherein the inpainting filter is configured to accelerate texture sampling, wherein applying the inpainting filter comprises:

masking the human body in an image comprised in the camera input using an input mask, performing a plurality of levels of sampling based on the masked image, wherein the performing a plurality of levels of sampling comprises performing an initial level of sampling with a predetermined resolution, and performing a ping-pong operation at each of the plurality of levels of sampling; and blending output of the inpainting filter with images comprised in the camera input to generate camera input backgrounds.

15. The non-transitory computer-readable storage medium of claim 14, wherein the performing an initial level of sampling further comprises:

performing an initial sampling on original texture of the masked image with the resolution of 16×16; and performing a plurality of iterations at the initial level of sampling by performing the ping-pong operation.

16. The non-transitory computer-readable storage medium of claim 15, wherein the performing a plurality of levels of sampling further comprises:

upsampling texture resulted from a previous level of sampling with a higher resolution, wherein the higher resolution is twice a resolution of the previous level of sampling; and performing a plurality of iterations at a current level of sampling by performing the ping-pong operation.

17. The non-transitory computer-readable storage medium of claim 14, the operations further comprising:

rendering the virtual character on the camera input backgrounds, wherein the virtual character is rendered at locations from which the human body was removed;

implementing animation of the virtual character based on detecting facial landmarks and movements of the user in real time;

generating sounds in real time for the virtual character based on source sounds received from the user; and generating and outputting the video, wherein the user is invisible in the video, and wherein the video comprises the virtual character with animation and with the sounds.

\* \* \* \* \*